US009396195B1

(12) United States Patent
Beguelin (10) Patent No.: US 9,396,195 B1
(45) Date of Patent: Jul. 19, 2016

(54) COMMUNITY GENERATED PLAYLISTS

(75) Inventor: Adam Louis Beguelin, Ho Chi Minh (VN)

(73) Assignee: AOL Inc., Dulles, VA (US)

( * ) Notice: Subject to any disclaimer, the term of this patent is extended or adjusted under 35 U.S.C. 154(b) by 683 days.

(21) Appl. No.: 11/970,461

(22) Filed: Jan. 7, 2008

Related U.S. Application Data (60) Provisional application No. 60/954,418, filed on Aug. 7, 2007.

(51) Int. Cl.
*G06F 17/30* (2006.01)
*H04L 29/08* (2006.01)

(52) U.S. Cl.
CPC ........ *G06F 17/30053* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2003/0221541 A1* | 12/2003 | Platt | 84/609 |
| 2005/0251807 A1* | 11/2005 | Weel | H04L 67/10 719/310 |
| 2006/0173974 A1* | 8/2006 | Tang | 709/217 |
| 2006/0239648 A1* | 10/2006 | Varghese | 386/95 |
| 2007/0016599 A1* | 1/2007 | Plastina et al. | 707/101 |
| 2007/0098351 A1* | 5/2007 | East et al. | 386/46 |
| 2007/0168463 A1* | 7/2007 | Rothschild | 709/217 |
| 2007/0294297 A1* | 12/2007 | Kesteloot et al. | 707/104.1 |
| 2008/0040673 A1* | 2/2008 | Zuckerberg et al. | 715/745 |
| 2008/0059992 A1* | 3/2008 | Amidon et al. | 725/25 |
| 2008/0091771 A1* | 4/2008 | Allen et al. | 709/203 |
| 2008/0133037 A1* | 6/2008 | Hempleman et al. | 700/94 |
| 2008/0320139 A1* | 12/2008 | Fukuda et al. | 709/226 |
| 2009/0019375 A1* | 1/2009 | Garofalo | 715/753 |

OTHER PUBLICATIONS

Welcome to Flickr—Photo Sharing, online retrieved May 7, 2008. http://www.flickr.com/.
Fm.com, What you need, when you need it, online retrieved May 7, 2008. http://www.last.fm.com.
Bridge, Derek and Kelly, John Paul, "Ways of Computing Diverse Collaborative Recommendations". University of College Cork, Cork, Ireland. 2006, 10 pages. Accessed from the Internet http://citeseerx.ist.psu.edu/viewdoc/summary?doi=10.1.1.62.4790. View download.
"Help Center", You Tube, (Retrieved Online Jan. 30, 2007) 9 pages. Accessed from the Internet, http://www.google.com/support/youtube/bin/answer.py?answer=57792&ctx=sibling.
"Recommender System", Wikipedia, (Retrieved Online Feb. 15, 2007), 2 pages. Accessed from the Internet, http://en.wikipedia.org/wiki/Recommendation_system.
"Listen with Last.fm and fuel the social music revolution", Last.fm (Retrieved Online Feb. 15, 2007), 3 pages Accessed from the Internet, http://www.last.fm/tour/.

(Continued)

*Primary Examiner* — Thomas Dailey
(74) *Attorney, Agent, or Firm* — Finneganm Henderson, Farabow, Garrett & Dunner, LLP (57) ABSTRACT

The present invention discloses systems and methods for sharing video content within a user's social network. In particular, the members of the user's social network can act as both recipients and senders of shared video content. An exemplary method for sharing videos includes identifying a video to be shared, identifying one or more recipients, and causing a playlist for each recipient to be populated with the shared video.

22 Claims, 7 Drawing Sheets

(56) References Cited

OTHER PUBLICATIONS

"About Multiply", Multiply, (Retrieved Online Feb. 15, 2007), 6 pages Accessed from the Internet, http://multiply.com/info/about.

"Collaborative Filtering", Wikipedia, (Retrieved Online Feb. 15, 2007), 6 pages Accessed from the Internet, http://en.wikipedia.org/wiki/Collaborative_filtering.

Stewart, Ryan, "Social Music Overview", Techcrunch, (Retrieved Online Jun. 26, 2008), 21 pages Accessed from the Internet, http://www.techcrunch.com/2007/02/05/social-music-overview/.

"About Flickr", Flickr, (Retrieved Online Jun. 26, 2008), 2 pages Accessed from the Internet, http://www.flickr.com/about/.

* cited by examiner

Heather's Video Playlist

| File | Shared By | Heather's Rating |
|---|---|---|
| Video 4 | Dwight Fan ☆☆☆☆ in fans of "TV Show 1" | |
| Video 5 | Amber ☆☆☆ | |
| Video 6 | N/A | |
| Video 11 | Steve ☆☆☆ | |

COMMUNITY GENERATED PLAYLISTS

CROSS-REFERENCE TO RELATED APPLICATIONS

This application claims priority to and benefit from U.S. Provisional Patent Application Ser. No. 60/954,418, filed Aug. 7, 2007, and entitled "Community Generated Playlists," which application is incorporated herein by reference in its entirety.

BACKGROUND OF THE INVENTION

1. The Field of the Invention

The present invention relates generally to a video sharing network, and more particularly to a method of distributing videos to a social community within a computerized network.

2. The Relevant Technology

Recently, the phenomenon of Internet sharing has gained widespread popularity thanks to many technological advances that make it easier and safer to communicate and distribute content over the Internet. One area of particular interest is the emergence of viral video, or video clip content which gains widespread popularity though the process of Internet sharing. Generally, this content is distributed through email, instant messaging, blogs, or other media sharing websites.

Perhaps one reason for the sudden surge in video content online is the proliferation of web-cams, camera phones, together with inexpensive video editing and publishing tools, which allow a potential videographer to easily create, edit, and distribute video content to a potentially limitless audience. Among popular distribution methods is the use of media sharing websites, where video and other media content may be uploaded by a user and stored on a media sharing server, where the content is available for downloading from anyone connected to the media sharing server via a network connection.

One disadvantage of current media sharing websites is that they are limited to the content that is offered within the particular site, without the capacity to retrieve additional content from other media sharing sites. Additionally, the current systems are limited in that they do not effectively utilize their existing social networks. Generally, such sites require each viewer to log in and manage videos received from each of their contacts, within each sharing community. While such systems can be effective for users who are constantly and actively updating and seeking out additional video content, the system is less effective for average users who have neither the time, inclination, nor computer savvy to manually discover, download, and add video content to their video playlist.

Thus, there is a need for an efficient social network distribution system, wherein members of a social network can easily share and/or play videos with other members of the network.

BRIEF SUMMARY OF THE INVENTION

The present invention solves one or more of the forgoing problems in the art with systems and methods for sharing video content in a user's social network. In particular, the members of the video sharing community can act as both recipients and senders of video content.

One embodiment of an exemplary method includes a computerized network environment that includes one or more video clients communicating with each other, each video client including video playing software associated with a playlist capable of queuing one or more videos to be played on the video client, the method of sharing videos including identifying a video to be shared, identifying at least one video client with which to share the video, and sending a request to cause a playlist associated with video playing software for the at least one video client to be automatically populated with the video so that the video is automatically played.

In one embodiment, a user may initiate video sharing by acting as a sender. In another embodiment, a user may act as a recipient in order to populate her own playlist with the recommendations or shared videos of other users. First, the sender identifies a video that she desires to share with other members of the sender's social network. Second, the sender identifies at least one recipient with which to share the video, for example, by identifying one or more individuals and/or one or more predefined communities in the sender's social network.

The system causes the recipient's video playing software to automatically add the received video to the recipient's playlist. In one embodiment, the system may autopopulate the playlist of the recipient by retrieving a copy of the video from a video content provider and storing the video. In another embodiment, the system may send an autopopulate command to the recipient's video playing software including the location of the video on a video content provider from which the video playing software can access the video. The recipient's video playing software may be located remotely at a video sharing server or locally at a video client. The video sharing server may be integrated with a video content provider and/or video search engine.

The invention may be used in any number of system configurations, including those with a video sharing server, which may be used to direct communications between users of the system. In another embodiment, the computer clients of the various users of the system may communicate using a peer-to-peer connection.

Using the invention, members of the sharing community can easily share video content without manually locating, sending, receiving, and/or adding videos to a playlist. Advantageously, this allows members of a sharing community to continuously enjoy a playlist automatically filled with a variety of videos recommended by the members' existing social network. Other sharing actions can also occur, such as a notification via email or instant messaging that the sender would like to share videos.

Another embodiment of an exemplary method includes a computerized network environment that includes one or more video clients communicating with each other, each video client including video playing software associated with a playlist capable of queuing one or more videos to be played on the video client, the method of sharing videos including identifying a video to be shared, identifying at least one video client with which to share the video, and sending a command to video playing software associated with the at least one video client to cause a playlist associated with the video playing software to be automatically populated with the video so that the video is automatically played.

Sender sharing configurations can be used to determine when the video to be shared will be identified, when the video client will be identified, and when the request to the video sharing server, client computer, or command to the video playing software will be sent. Recipient sharing configurations can be used to determine when the playlist associated with the video playing software will be automatically populated with the video so that the video is automatically played.

Yet another embodiment of an exemplary method includes a computerized network environment that includes one or more video clients communicating with each other using a video sharing server or decentralized network connection, each video client including video playing software associated with a playlist capable of queuing one or more videos to be played on the video client, the method of sharing videos including receiving a request from a sending video sharing client to share a video with at least one recipient video sharing client, identifying the sending video sharing client and the at least one recipient video sharing client as a sharing community, associating the video with the sharing community, causing a playlist in video playing software associated with at least one recipient video sharing client to be automatically populated with the video so that the video is automatically played, and tracking activity in the sharing community such that the activity is shared with all of the video sharing clients in the sharing community.

According to one embodiment of the invention, if a video is shared with a user (either as sender or recipient), the system identifies a "sharing community" and is able to track data pertinent to the videos shared within the sharing community. For example, the system may track metadata associated with a video such as, but not limited to, a ranking assigned by a user based on the user's enjoyment of the video, a "favorites" indicator, a "watchlist" indicator, a number of times the video has been viewed, a length of the video, a content description of the video, a recency timestamp, one or more categories associated with the video, one or more channels associated with the video, and the like. The system may also facilitate communications between members of a sharing community, such as, but not limited to, instant messaging, email, or an alert.

Additional features of the invention will be set forth in the description which follows, and in part will be obvious from the description, or may be learned in the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EMBODIMENTS

The present invention extends to systems and methods for sharing videos within a user's social network. In particular, the members of the video sharing community can act as both recipients and senders of video content. In one preferred embodiment, the playlists of the sharing community are automatically populated with shared videos, greatly facilitating the ease by which members of a sharing community can view and enjoy videos.

As used herein, the term "social network" refers to people or entities with which the user has a relationship from one or more different social sources. People or entities in a user's social network will be hereafter referred to as "users," "people," "members," "senders" or "recipients." For example, a user may have one social network associated with a particular video sharing service, music sharing service, and/or photo sharing service, another social network associated with one or more email and/or instant messaging accounts, and yet another social network created by an online social network service. All of these various different social networks can be included in a user's overall social network and create a pool of potential people with which a user may share videos. The user may also import people into her social network by identifying people with which the user would like to be associated, but who might not otherwise be associated with the user via another preexisting social connection. In addition, the user may add herself to another person's social network. Thus, a user's social network can be as small or as large as the user deems necessary and can continually change depending on the user's current social situation.

Within a user's social network may be one or more "predefined communities." A predefined community includes one or more member of a user's social network and can range in size from one person to a user's entire social network. A user may create predefined communities to identify people that are associated with a user in a particular way using categories such as, but not limited to, family, friends, interests, business, and the like.

In addition, a "sharing community" can be created including two or more persons with which a video is shared. A sharing community is not bound by any particular predefined communities that a user may own. However, as described in further detail below, a sharing community may be identified by selecting people in a user's social network that may or may not be part of a predefined community. Thus, in some embodiments, a sharing community may include the same members as a predefined community.

Using systems and methods of the present invention, a user can share videos either as a sender or a recipient with one or more members of the user's social network associated with the video sharing service. In one embodiment, a user can facilitate sharing by creating one or more predefined communities of other video sharing subscribers within the video sharing service. However, embodiments of the invention also contemplate that the user's social network selectable through the video sharing service can also be linked with social networks from other sources, such as a user's email or instant messaging accounts.

Once a sharing community is identified including at least one sender and at least one recipient, a video sharing server or video sharing command from the sender can cause all of the members of a sharing community to share the video content. Embodiments for sharing videos include notifying members of the sharing community that a video has been shared via a communication such as, but not limited to, email, instant messaging, or an alert. Other embodiments for sharing videos include automatically including shared videos on recipients' favorites lists or watchlists. Preferred embodiments for sharing videos include automatically populating and/or queuing the shared video content in the media playlist of the members of the sharing community.

As used herein, on the sender-side, the term "share" will refer broadly to various ways of notifying, sending copies of videos, autopopulating favorites lists or watchlists, autopopulating playlists, or otherwise communicating to members of a sharing community that a sender would like recommend one or more videos. On the recipient-side, the term "share" will refer broadly to various ways of receiving notification, receiving copies of videos, having a favorites list or watch list autopopulated, having a playlist autopopulated, or otherwise receiving communication that a member of a sharing community would like to recommend one or more videos.

Once a sharing community is identified, the system can track a sharing community to facilitate continued communication between members of the sharing community. Thus, the present invention provides systems and methods for members of a video sharing community to share video recommendations easily and efficiently.

Figure 1A:
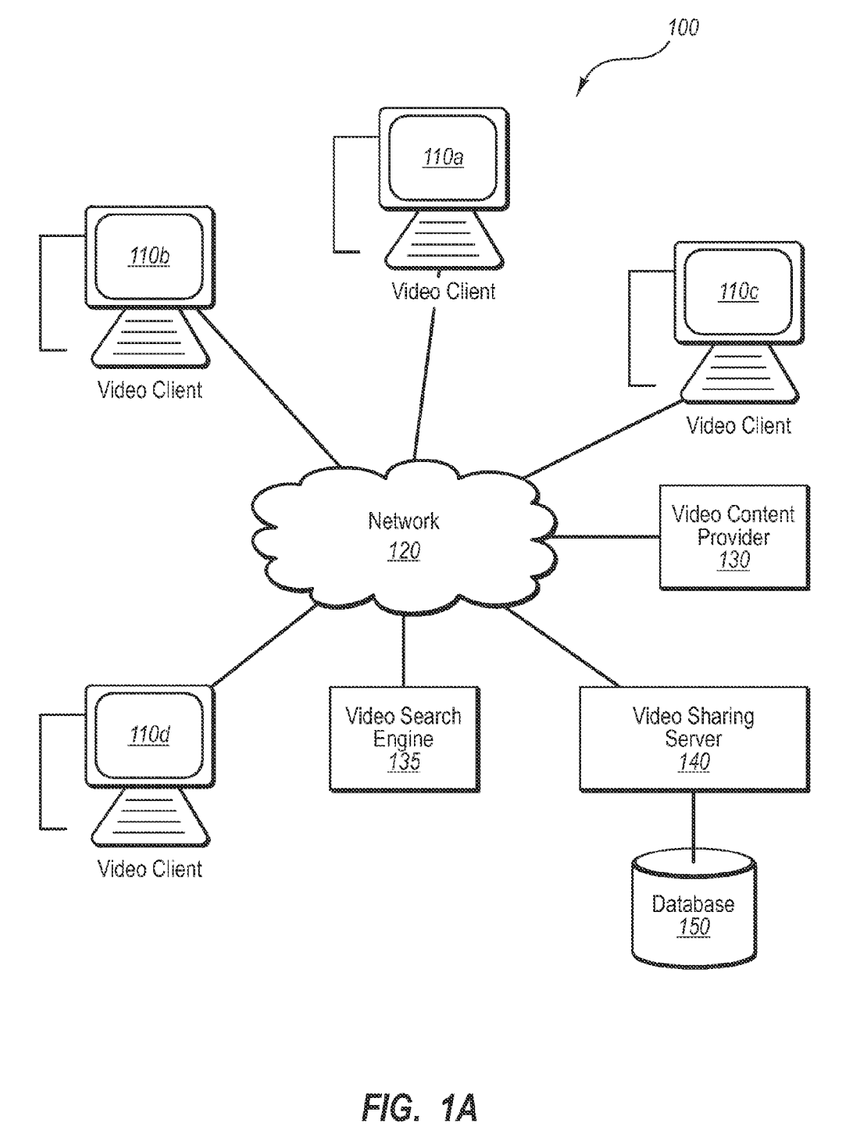
FIG. 1A illustrates an exemplary network computer environment that may be used in accordance with the present invention.

FIG. 1A illustrates one computerized environment 100 that can be used in association with the present invention. The environment includes a network 120 coupled to a number of video clients 110a-d. The terms "client" and "user" may be used interchangeably to refer to the fact that any number of users may access the network 120 via clients 110. Each of the clients 110a-d may include any specific or general computer system that is equipped to receive or play video content and, as such, includes video playing software residing thereon. The computer may be, for example, a personal computer, or any other computing machine. A suitable computer system may include a modem, a monitor, a keyboard, a mouse, system software including support for TCP/IP communication, and browser software. The network 120 may be any local or global computer network.

Clients 110a-d are able to access video content via network 120 from one or more video content providers 130. In another embodiment, clients 110a-d may access a video search engine 135 that crawls one or more vide content providers 130 to provide access to video content. In still another embodiment, clients 110a-d can access video content transmitted by email, instant messaging, or other similar means, by selecting on a link or icon containing executable instructions instructing the client to retrieve the video or instructs the video playing software to stream the video. In either case, after accessing video content, one or more clients 110a-d may desire to share video content with each other.

A video sharing server 140 is connected to network 120 and is configured to send and receive communications from the video sharing clients 110a-d, to manage sharing session information, and to access video content from one or more video content providers 130 and/or video search engines 135. The video sharing server 140 may also be connected to a database 150 that can be used to store data relating to user's social networks, predefined communities, sharing communities, sharing sessions, user information, or even video content. The video sharing server 140, database 150, and video content provider 130 may be integrated into one computer, or may operate separately in a distributed environment. The distributed environment shown in FIG. 1 is depicted by way of example only, and one of skill in the art would understand that any number of system configurations may be used in accordance with the present invention.

Figure 1B:
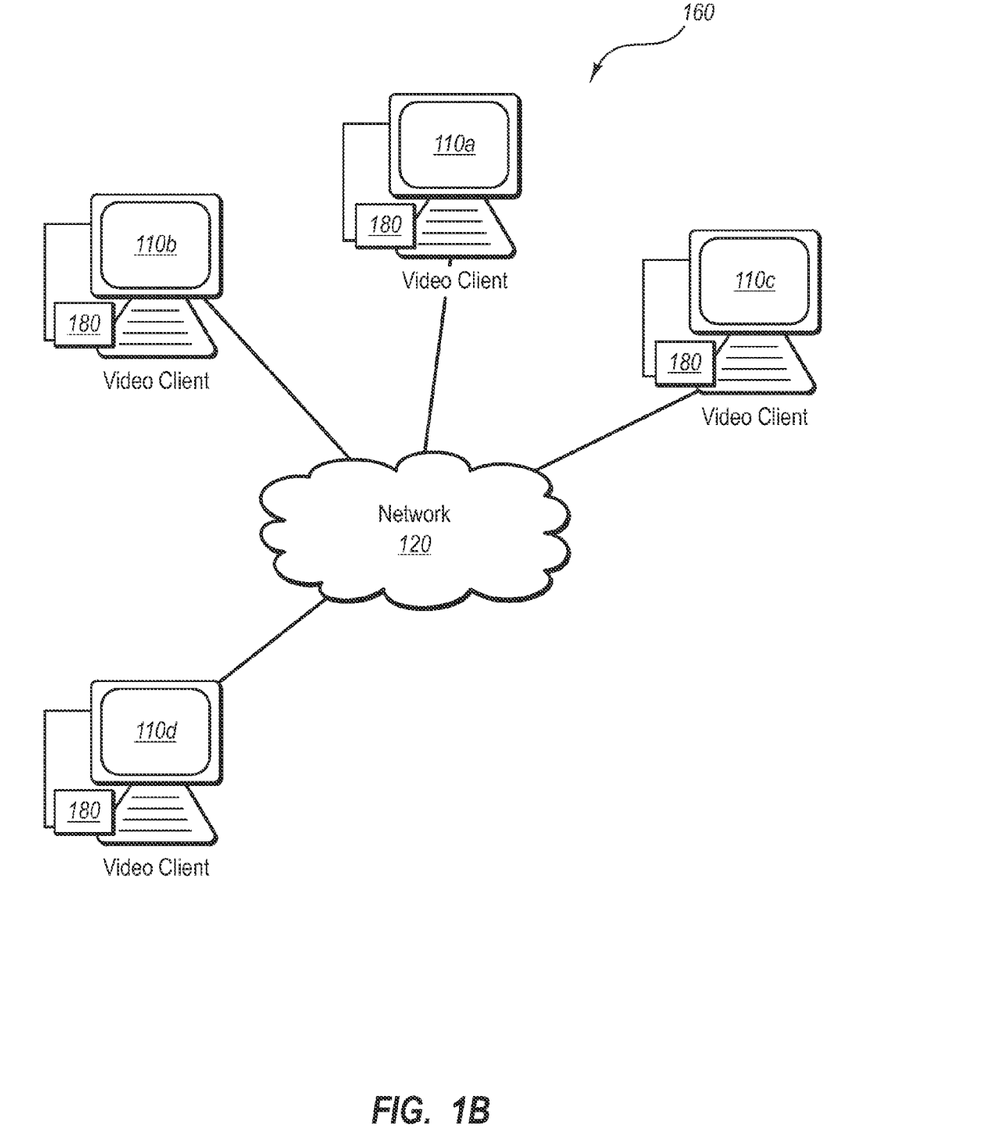
FIG. 1B illustrates another network computer environment that may be used in accordance with the present invention.

FIG. 1B illustrates a second computerized environment 160 that can be used in association with the present invention. The environment 160 includes a network 120 coupled to a number of video clients 110a-d. In this embodiment, the clients 110 communicate with each other using a video sharing service 180 that resides in a decentralized connection, such as a peer-to-peer connection, instant messaging connection, or the like. Thus, in this embodiment, there is no need for a centralized video sharing server and each video client can send and receive videos with other video clients without communicating with a central database. Advantageously, this allows for a system that is more scalable, and fault-tolerant, without requiring the resources typically required in centralized systems, such as the system illustrated in FIG. 1A.

Figure 2:
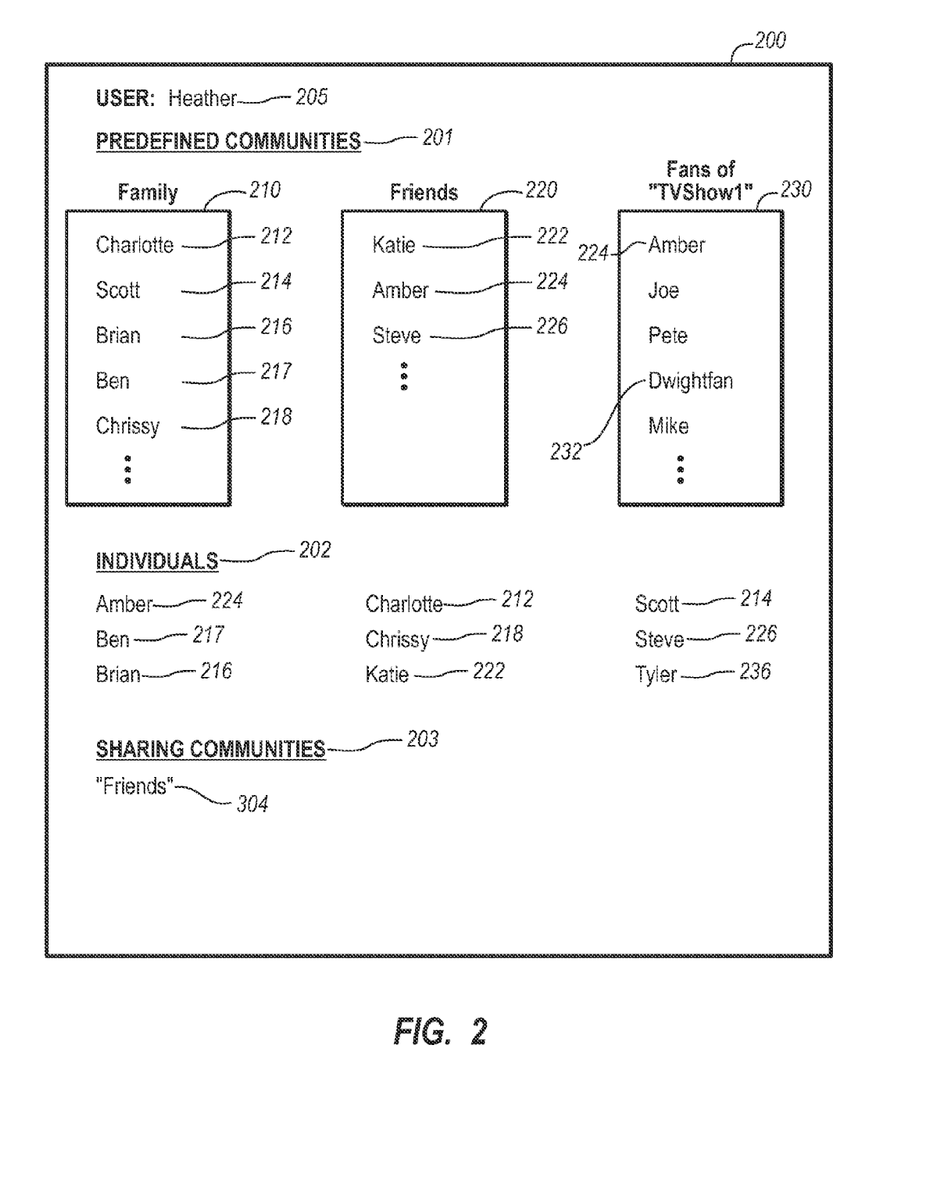
FIG. 2 is a block diagram illustrating an example of a user's various communities.

FIG. 2 is a block diagram that illustrates an implementation of the present invention in which a user, Heather 205, creates one or more predefined communities 201 from the user's social network 200 in order to facilitate sharing videos. The first community "Family" 210 is filled with members of Heather 205's social network 200 who have some familial association with Heather 205. As shown in FIG. 2, the members can be selected from an individual list 202 and grouped into predefined communities. Thus, after the community "Family" 210 is created, Heather 205 can select Family Community 210 which identifies Charlotte 212, Scott 214, Brian 216, Ben 217, and Chrissy 218 as potential members for a sharing community 203.

The user may create any number of predefined communities 201, each including any number of video sharing users. For instance, returning to FIG. 2, Heather 205 has also created a "Friends" community 220 including Amber 224, Katie 222 and Steve 226. It should be appreciated that a member of Heather 205's social network may be a member of more than one predefined community 201. Thus, in FIG. 2, Amber 224 is a member of both the Friends community 220 and the "Fans of 'TV Show1'" community 230. Thus, Amber 224 will receive any video content Heather 205 shares with the Friends community 220 together with any video content shared with the Fans of "TV Show 1" community 230.

According to another embodiment, the user may join an existing video sharing community to her social network 200. For example, in FIG. 2, Heather 205 may elect to join an established online community of users who enjoy the television show "TVShow 1." In this example, even though Heather 205 did not initially create the "Fans of TVShow 1" community 230, she may join herself to the community, which causes the community to appear within her social network 200. Additionally, Heather 205 may have anonymous users within her social network, such as Dwightfan 232.

Advantageously, providing predefined communities 201 allows the user to share video content with other video sharing users with whom the user shares common interests. For example, Heather 205 may share videos with the members of "TV Show 1" community 230 that include a similar tenor, plotline, or characters between the video and the episodes of "TV Show 1." Accordingly, a user may create various predefined communities 201 including members with similar interests or tastes for sharing videos.

One embodiment of the present invention is the ability to include in her social network 200 one or more of the user's preexisting social networks. For example, a user may import her instant messaging "buddy list," email distribution group, or other existing social networking using an importing tool or other passive connection between the video sharing service and other services (e.g., email, instant messaging, social networks). This allows the user to easily and quickly create a predefined and/or sharing community without requiring the user to manually recreate her social network from scratch.

In cases where the user is a sender, a user can identify a sharing community 203 by selecting individuals 202 and/or a predefined community 201. In some cases, a sharing community 203 can be the same as a predefined community 201 where a user desires to share a video with all members of a particular predefined community. In another embodiment, a user can also select members of a sharing community 203 from a combination of individuals and predefined communities. For example, a user may select Family community 210, and highlight only certain members of that particular community, by holding down the shift key or the ctrl key while clicking on a mouse button, which is known in the art. The user may continue to select as many individuals and/or members of one or more predefined communities until she has finished identifying her desired sharing community. In some cases, individuals may exist in a user's social network 200 without being linked to any particular predefined community 201. For example, Heather 205 may have a contact Tyler 236 listed as an individual 202 without Tyler being associated with any predefined community 201.

Figure 3:
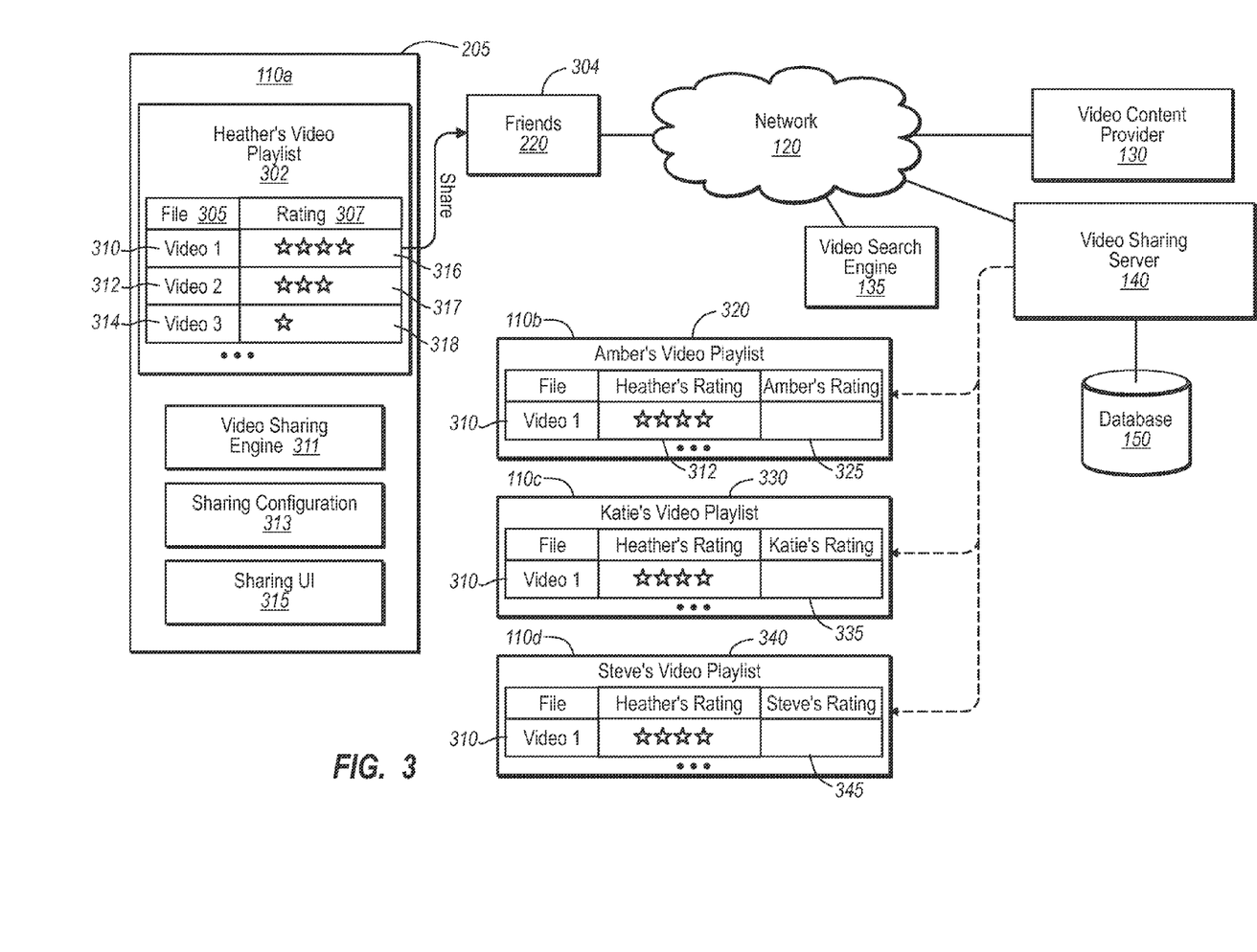
FIG. 3 is a exemplary block diagram illustrating the present invention in the embodiment wherein a user is a sender of shared videos.

A sharing community thus includes the user and at least one other person. Once a user has identified a sharing community 203, a user can then share videos with those members. For example, together with FIG. 2, FIG. 3 illustrates an exemplary implementation of the present invention where user Heather 205 is associated with a video playlist 302 that identifies videos that the user has viewed or has otherwise accessed. FIG. 3 depicts that the user's video playlist 302, a video sharing engine 311 and a sharing configuration 313 may be located locally on a video client 110a. While not shown, one or more of the video playlist 302, video sharing engine 311, or sharing configuration 313 may be located remotely from client 110a at video sharing server. A sharing user interface 315 may also be located on client 110a to allow user 205 to specify sharing rules at client 110a.

In one embodiment, user 205 acts as a sender who wishes to share a particular video file 305 referred to as "Video 1" 310 to each member of an identified sharing community 304. In this example, sharing community 304 contains the same members as the Friends community 220 from FIG. 2. This illustrates that having predefined communities can greatly facilitate video sharing, especially where the user 205 anticipates or otherwise performs multiple instances of sharing with the same people. In this example, Heather 205's video playlist 302 includes videos "Video 1" 310, "Video 2" 312, and "Video 3" 314.

According to one embodiment of the invention, the user can associate a ranking 307 with each video file 305 in relation to the user's enjoyment of the video. For example, Heather 205 has given "Video 1" 310 a 4-star ranking 316, "Video 2" a 3-star ranking 317, and "Video 1" a 1-star ranking 318. It will be appreciated that there are various other ways for a user to rank their approval or disapproval of a particular video file 305 including, but not limited to, percentages, thumbs-up/thumbs-down indicators, number-scale rankings, or the like. Further, the user may be able to modify their approval or disapproval ranking for a particular video, meaning that a user may disfavor a video that was once approved or favorited, and the system will no longer continue to share that video with others within the user's social network.

Rankings 307 are one example of metadata that can be associated with video files 305. Other metadata includes, but is not limited to, a "favorites" indicator, a "watchlist" indicator, a number of times the video has been viewed, a length of the video, a content description of the video including tags or keyword descriptors, a number of times the video has been shared, a number of times the video has received "favorites" status, a recency timestamp, one or more categories associated with the video, one or more channels associated with the video, and the like.

The user can utilize sharing user interface 315 specify situations in which sharing should occur. In one embodiment, sharing user interface 315 can be integrated with a user interface that allows a user to access video content, for example, from video content provider 130 and/or video search engine 140. The sharing user interface 315 allows a user to actively identify one or more videos in the user's video playlist 302 and one or more sharing communities 203 with which to share the video(s). In another embodiment, the sharing user interface 315 allows a user to specify rules in a sharing configuration 313 to enable video sharing to occur transparently and automatically.

In one example, video sharing engine 311 periodically determines whether a sharing event should occur. Suppose a user has rules in sharing configuration 313 indicating that videos in the user's video playlist 302 having a ranking of 4 stars or higher should be shared with a sharing community 304 that corresponds to predefined community 220.

According to one embodiment, after video sharing engine 311 identifies "Video 1" 310 for sharing to the identified sharing community 304, video sharing engine 311 causes a communication to be sent to the video sharing server 140 through the network 120. Upon receiving the request to share the video 310, the video sharing server 140 associates the identified sharing community 304 and video 310. In another embodiment using a decentralized configuration, such as the one illustrated in FIG. 1B, the video sharing engine 311 causes a communication to be sent directly to each member of the identified sharing community 304.

Sharing of the video can then occur in various ways. In one example, video sharing server 140 may send a notification to members 222, 224, 226 of sharing community 304 that a request has been made by user 205 to share video 310 with these members. In another configuration, the notification may be sent directly from the video sharing engine 311 to each of the members 222, 224, 226 of the sharing community. Notification can occur via a communication such as but not limited to email, instant messaging, alert, and the like. The communication may include a link, IP address, a copy of the video itself, or other data relating to the location of the video content, together with executable instructions instructing the recipient computer to retrieve the video or instructing the video playing software to stream the video when the recipient clicks on a link or icon in the communication. In another example, the communication can include identification of the video 310 as a "recommendation" in, for example, a favorites list, watchlist, or other video organizing system, the members being able to view the recommendation and then select to watch the video 310.

In yet another example, video sharing server 140 can automatically populate the members' playlists 320, 330, 340 by retrieving a copy of the video 310 from a video content provider 130 and distributing a copy of the video to the playlists of each member 320, 330, 340 of the sharing community 304. In another embodiment, the video sharing server 140 may update playlists 320, 330, 340 with a link containing a path or content address of the video content. Thus, a user may help fill the playlists of members of his or her social network by recommending videos. The playlist may be filled by placing the recommended videos in any order, meaning that the recipient may replay the videos in any order, regardless of when they were recommended or received. Advantageously, because a user normally has a social connection to the members of the sharing community, the members of the sharing community would likely want to view a video that is recommended by a friend or associate and is saved the added trouble of actively adding a recommended video to the member's playlist.

FIG. 3 illustrates one embodiment of autopopulating a playlist including a video sharing server 140 according to the environment of FIG. 1A. The dashed lines between video sharing server 140 and clients 110b, 110c, 110d indicated that the communication can be direct or indirect (e.g., via network 120). It will be appreciated that clients 110b, 110c, 110d may also have the same components as client 110a. In addition, each client 110a-d may include communication client software, such as email, instant messaging, and/or alert software that may or may not be integrated with the video playing software located on each client. Similarly, the video sharing engine 311 located on video sharing server 140 may also include communication software to facilitate email, instant messaging, and/or alert communications.

According to in one embodiment of the invention, the video sharing system tracks the metadata for videos shared for a particular sharing community. In the example of FIG. 3, each playlist 320, 330, 340 of the sharing community 304 will have access to user 205's ranking 316 of the video 310. For example, the user 205's ranking 316 of video 310 may be displayed by video playing software located at each client 110b-d. Further, members of the sharing community 304 can input their own ranking or other communications about the shared video 310 through a sharing user interface, which ranking is transmitted to video sharing server 140 by the video sharing engine located on each client 110b-d. The system can then store these rankings associated with the sharing community so that the communication is shared with the entire sharing community 304. This allows the members of the sharing community 304 to see how other members rated a particular video in comparison to their own ranking and can also encourage and/or motivate communication between the members of the sharing community 304.

For example, Amber 224 may give "Video 1" 310 a ranking 325 that is the same, higher, or lower than ranking 316 accorded by Heather 205. The difference between the two rankings 316, 325 may be used to determine the similarity of Heather 205 and Amber 224's video tastes. For instance, if Heather 205 and Amber 224 often give videos the same ranking, user Heather 205 may determined that Heather 205 and Amber 224 have very similar video watching preferences and she may continue including Amber 224 in similar types of video recommendations. Conversely, if Heather 205 and Amber 224 often rank videos very differently, then user Heather 205 may conclude that the two subscribers have different preferences and Heather 205 may choose to exclude Amber 224 from similar types of video recommendations.

Heather 205 could also initiate an instant messaging session via her sharing user interface 315 that invites all members of the sharing community 304 to participate. This allows members to exchange commentary about the particular subject matter of the shared video 310 or any other topic that these members may want to discuss.

A user could also use rankings or other metadata that may be available to search for other users with similar interests and preferences. A user may then add another person with similar tastes to her social network 200. Advantageously, this system facilitates a user in seeking out other users with similar interests and helps create a community of video sharing, wherein users with common tastes and preferences assist each other in discovering video content. Using this system, a user is more likely to share videos that will be enjoyed by a particular community than is generally possible using traditional search and distribution methods. Likewise, advertisers may identify target sharing communities based on shared video content, and/or associated metadata, and the like to promote products and/or services to the members of the sharing community by providing recommended videos sponsored by the advertiser.

Figure 4:
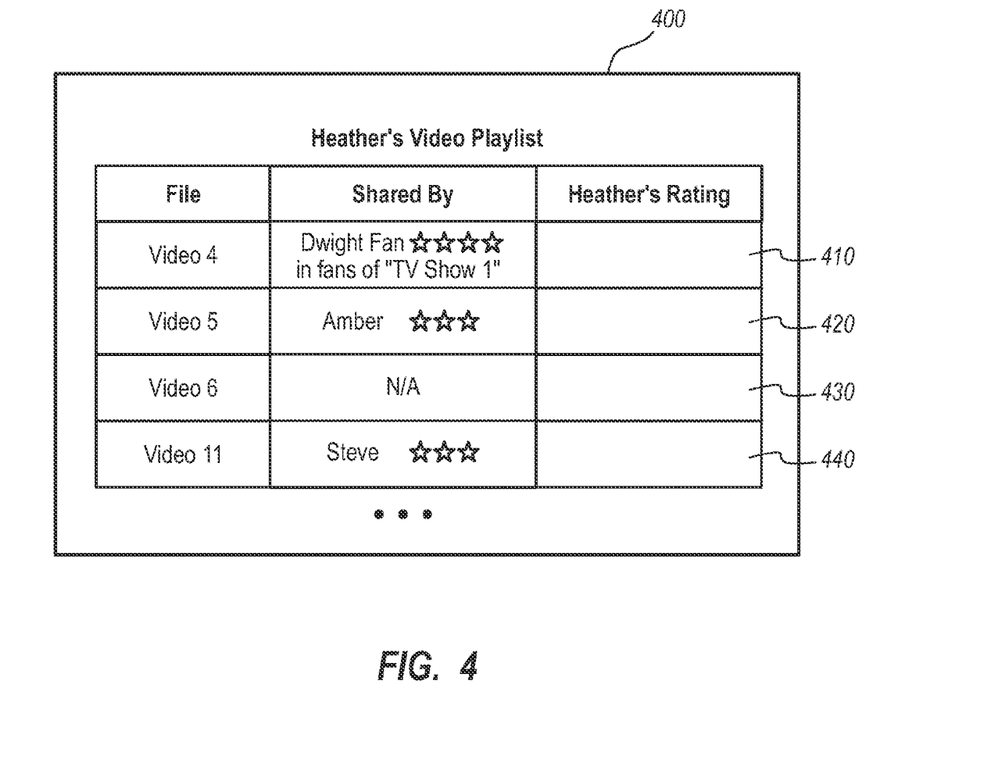
FIG. 4 is a exemplary block diagram illustrating a sample playlist of a user in the embodiment wherein a user is a recipient of shared videos.

One aspect of the invention is the ability of the user to act as a recipient of shared videos in order to fill the user/recipient's playlist based on shared videos from the user's social network. FIG. 4 illustrates an example of a user's playlist generated from shared videos from other members of the user's social network 200. Here, user Heather 205's video playlist 400 has been populated with recommended videos 410, 420 and 440 from users Dwightfan 232, Amber 224 and Steve 226, respectively. Note that senders can recommend videos individually or as part of a sharing community. For example, video 410 was recommended by user Dwightfan 232 within sharing community "Fans of 'TVShow 1'" 230, where the video was recommended to all members of this sharing community. As discussed above, user 205 is able to input a ranking after viewing a shared video or may initiate other communications with people who share videos with that user.

FIG. 4 also illustrates that shared videos may be queued along with other videos that the user has selected for her playlist. For example, "Video 6" 430 is queued to be played after shared "Video 5" 420 but before shared "Video 11" 440. In one embodiment, the user can specify that shared videos be played last, first or interspersed evenly with other videos in the user's playlist.

Advantageously, having a user's playlist automatically populated with video recommendations from those in the user's social network eliminates the requirement of current methods of video sharing which require the user to open an email, receive a instant message, or other alert, open an attachment, click on a link, or otherwise locate a video file manually, and then have to initiate video playing software to access video playing functionality, and then find the proper command to add the video to her playlist. Furthermore, the invention assists users in discovering new videos and keeping his or her playlist full. Because it is likely that the members of the user's various communities have similar tastes and interests, a system based on the recommendations of other subscribers within the user's social network are more likely to include videos that will be more interesting and enjoyable to the user than the videos discovered using traditional search methods.

As discussed above, using sharing configurations 313, a user is able to specify various sharing rules for that particular user that apply when the user is a sender of shared videos and/or a recipient of shared videos. Where the user is a sender of shared video, the user's sender sharing configurations may specify certain sharing levels such as a default to automatically share all videos in the user's favorites with everyone in the user's social network or with particular identified sharing communities, specify that sharing can occur among recipients that may be 1-degree or more removed from the user's social network, specify filter terms to prevent certain content (e.g., explicit material) from being shared, specify filter terms to identify content that the user knows that others are interested in to be shared, specify that only videos with certain rankings be shared with others, and the like, or any combination of above.

The user may also specify configurations that apply when the user is a recipient of a shared video. For example, a user's recipient sharing configurations may specify filter terms to filter out certain content that the user does not want shared with her, specify filter terms to identify content in which the user is interested, specify that sharing can only occur from members of the user's social network or certain members of a user's social network who may be on an "approved" or "whitelist," specify a certain ranking of videos that can be shared with the user, specify specific methods of notifying the user that a video has been recommended (e.g., via email, instant messaging, alerts, or specify automatic population of the user's playlist), specify the maximum amount of video content that can be added to the user's playlist contributed by recommendations from any source, specify to receive recommendations from users who have 2-degrees or less of separation from the user within the social network, specify to receive content with certain associated metadata, or the like, or any combination of the above.

Using sharing configurations, a user may create a trusting relationship between herself and selected members of the video sharing network. One example of where recipient sharing configurations become particularly useful is to assist a user/recipient to identify video content source(s) with whom the user/recipient regularly wishes to receive recommendations to autopopulate the user/recipient's playlist because the user/recipient feels that video recommendations from that particular video content source(s) are worthwhile to view. By allowing a user/recipient to select particular video content source(s) that she thinks are interesting, this greatly eliminates the effort required of the user/recipient to identify interesting videos.

For example, a user/recipient may discover that the "favorites" videos for Dwightfan 232 are interesting and believes that Dwightfan will continue to add interesting videos to his favorites list. Thus, the user/recipient in her recipient sharing configuration can select to have video sharing system periodically monitor the activity of Dwightfan 232's account to determine if Dwightfan 232 has viewed any new videos that have not been shared with the user/recipient. The user/recipient may also specify additional requirements that must occur before video sharing system communicates a new video to be shared with the user/recipient. For example, the user/recipient may further specify that only new videos viewed by Dwightfan 232 that receive a certain ranking or a "favorites" status from Dwightfan 232 can be shared with the user/recipient.

This concept of identifying particular video content source(s) with which video content will be automatically shared with a user/recipient can be as broad or narrow as specified by the user/recipient. For example, a user/recipient may specify the video content source to be a certain sender video client, a certain video content provider 130, a certain video search engine 135, or any member(s) of the user's social network to serve as the video content source that can be regularly monitored to identify video content that is automatically shared with the user/recipient and, preferably, auto-populated to the user/recipient's playlist.

Figure 5:
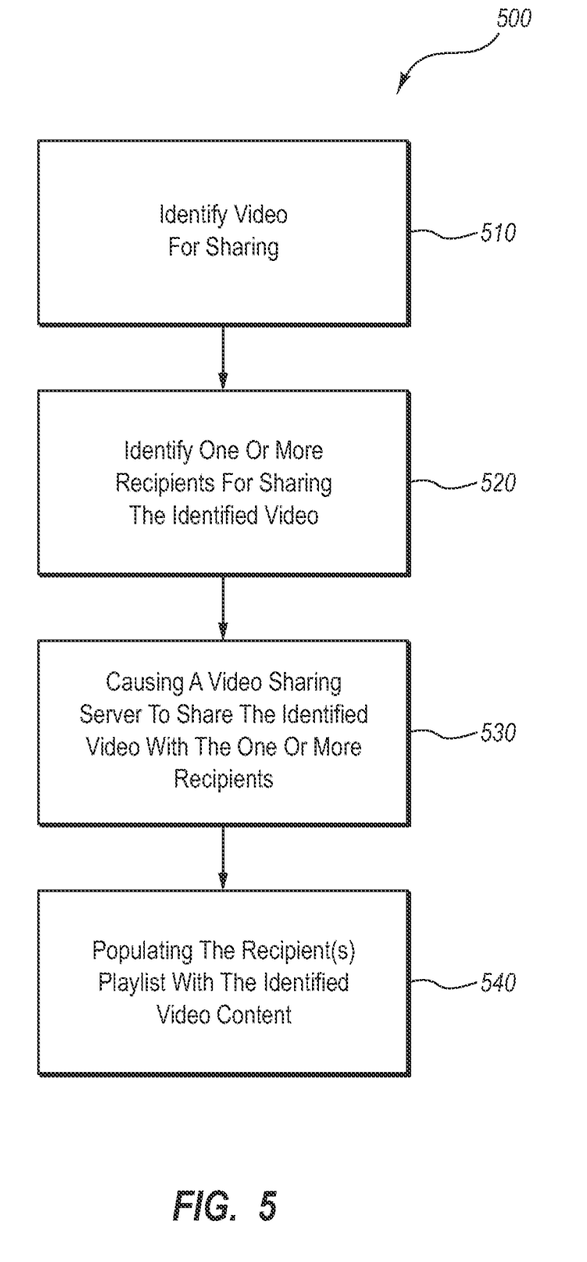
FIG. 5 is a block diagram illustrating an embodiment of the invention wherein the video sharing is initiated by a sender.

FIG. 5 is a block diagram illustrates a method 500 for sharing video between two or more video clients in a computerized network system. At 510, a sender identifies a video for sharing with one or more of the video clients. At 520, the sender also selects one or more video clients for receiving the video, known as recipient(s). As discussed above, the sender can be the user or a member of the user's social network. Anyone that shares with the user can be a member of the user's social network (e.g., can be added or imported). In one embodiment, the recipient is a member of the user's social network. As such, depending on whether the user is on the initiating end, the user will be a user/sender. If the user does not initiate the sharing, but is a recipient of the sharing, the user will be a user/recipient.

At 530, a video sharing server or video sharing service located on the user's computer identifies a request to share the video with each of the identified recipients. As discussed above, the video sharing system may cause the recipient to receive a communication via email, instant messaging, alert, and the like, or may place the shared video in the recipient's favorites or watchlist, including a link, IP address, a copy of the video itself, or other data relating to the location of the video content, together with executable instructions instructing the recipient computer to retrieve the video or instructs the video playing software to stream the video when the recipient clicks on a link or icon in the communication.

In a preferred embodiment, at 540, the video sharing server or local video sharing program populates the video playlist of each identified recipient with the video content. As mentioned above, the recipient's playlist can reside at the video client or at the video sharing server. The video sharing system can update the recipient's playlist by sending a command to add the shared video to a playlist, wherein the command includes a metadata containing a path or content address that identifies the location from which the video content can be accessed. In another embodiment, the video sharing system can send a command, wherein the command includes a copy of the shared video.

Figure 6:
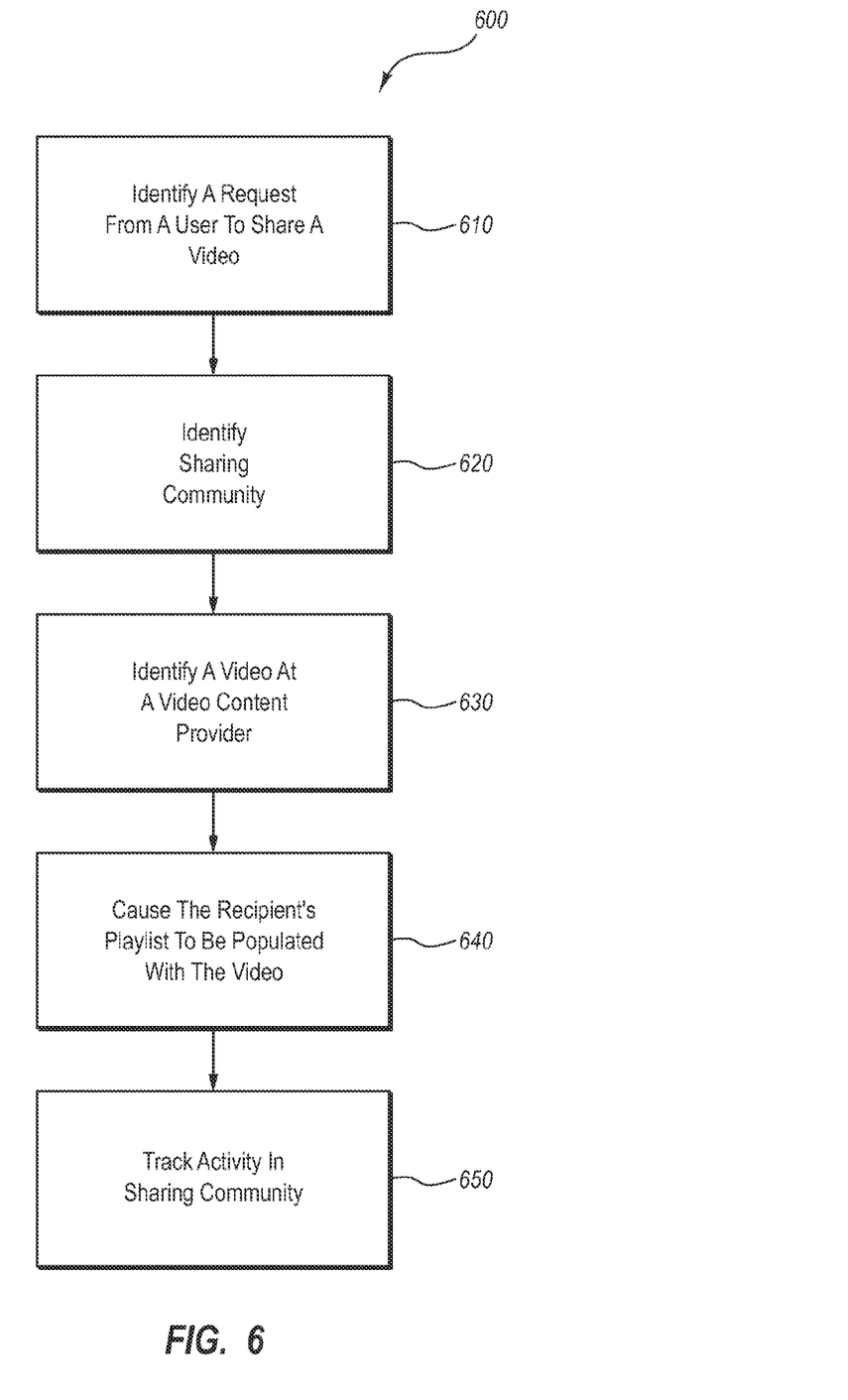
FIG. 6 is a block diagram illustrating an embodiment of the invention wherein the video sharing server manages video sharing.

FIG. 6 is a block diagram illustrating a method 600 for sharing video within a video sharing community from the video sharing server or video sharing program located locally on a user computer's perspective. First, at 610, the server or program identifies a request from a video sharing user to share video with one or more members of the video sharing community. Upon identifying the request, at 615, the server or program identifies a sharing community comprised of the user and the identified recipients. At 620, the server or program identifies the location of the video. In one embodiment, where the video sharing server or video sharing program and the video content provider are located on the same system, the shared video may also be located on the video sharing server.

After locating the video content, the video sharing server or video sharing program causes the video content to be shared. As discussed above, the video sharing server or video sharing program may cause the recipient to receive a communication via email, instant messaging, alert, or may place the shared video in the recipient's favorites or watchlist, including a link, IP address, a copy of the video itself, or other data relating to the location of the video content, together with executable instructions instructing the recipient computer to retrieve the video or instructs the video playing software to stream the video when the recipient clicks on a link or icon in the communication.

In a preferred embodiment, at 640, the video sharing server or video sharing program causes the recipient's playlist to be populated with the shared video. As mentioned above, the recipient's playlist can reside at the video sharing server or at the video client. The video sharing server or video sharing program can update the recipient's playlist by sending a command to add the shared video to a playlist, wherein the command includes a metadata containing a path or content address that identifies the location from which the video content can be accessed. In another embodiment, the video sharing server or video sharing program can send a command, wherein the command includes a copy of the shared video.

At 650, the video sharing server or video sharing program tracks activity in the sharing community such that the activity is shared with all of the members of the sharing community.

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computerized network environment that includes one or more video clients communicating with each other using a video sharing server or decentralized network connection, each video client including video playing software associated with a playlist capable of queuing one or more videos to be played on the video client, a method of sharing videos comprising:
   automatically selecting a video to be shared by a sharing user with a group of users in a social network based on a user-assigned rank of the video meeting a predetermined threshold rank, the predetermined threshold rank associated with the social network group; and
   based on the user-assigned ranking of the video meeting the predetermined threshold rank and the predetermined threshold rank being associated with the social network group, automatically sending a request to cause a playlist associated with video playing software of a recipient user in the social network group to be automatically populated with the video, the video playing software being configured to automatically populate the video shared by the sharing user in the playlist of the recipient user if the request satisfies at least one sharing configuration defined by the recipient user,
   wherein the at least one sharing configuration defined by the recipient user is at least one of:
   the sharing user is an approved user;
   the user-assigned rank of the video meets a second predetermined threshold rank; and
   a maximum number of recommended videos has not been exceeded.

2. In a computerized network environment that includes one or more video clients communicating with each other using a video sharing server or decentralized network connection, each video client including video playing software associated with a playlist capable of queuing one or more videos to be played on the video client, a method of sharing videos comprising:
   automatically selecting a video to be shared by a sharing user with a group of users in a social network based on a user-assigned rank of the video meeting a predetermined threshold rank, the predetermined threshold rank associated with the social network group; and
   based on the user-assigned ranking of the video meeting the predetermined threshold rank and the predetermined threshold rank being associated with the social network group, automatically sending a command to video playing software of a recipient user in the social network group to cause a playlist associated with the video playing software to be automatically populated with the video, the video playing software being configured to automatically populate the video shared by the sharing user in the playlist of the recipient user if the request satisfies at least one sharing configuration defined by the recipient user,
   wherein the at least one sharing configuration defined by the recipient user is at least one of:
   the sharing user is an approved user;
   the user-assigned rank of the video meets a second predetermined threshold rank; and a maximum number of recommended videos has not been exceeded.

3. The method as recited in claim 1, wherein the video is automatically selected further based on:
a number of times the video has been shared.

4. The method as recited in claim 1, wherein the video is automatically selected further based on:
a content description of the video.

5. The method as recited in claim 1, wherein the video is automatically selected further based on:
a recency timestamp.

6. The method as recited in claim 1, wherein the video is automatically selected further based on:
a category associated with the video.

7. The method as recited in claim 1, wherein the video is automatically selected further based on:
a channel associated with the video.

8. The method as recited in claim 2, wherein the video is automatically selected further based on:
a number of times the video has been shared.

9. The method as recited in claim 2, wherein the video is automatically selected further based on:
a content description of the video.

10. The method as recited in claim 2, wherein the video is automatically selected further based on:
a recency timestamp.

11. The method as recited in claim 2, wherein the video is automatically selected further based on:
a category associated with the video.

12. The method as recited in claim 2, wherein the video is automatically selected further based on:
a channel associated with the video.

13. In a computerized network environment that includes one or more video clients communicating with each other using a video sharing server or decentralized network connection, each video client including video playing software associated with a playlist capable of queuing one or more videos to be played on the video client, a method of sharing videos comprising:
automatically selecting a video to be shared by a sharing user with a group of users in a social network based on a user-assigned rank of the video meeting a predetermined threshold rank, the predetermined threshold rank associated with the social network group; and
based on the user-assigned ranking of the video meeting the predetermined threshold rank and the predetermined threshold rank being associated with the social network group, automatically sending a command to video playing software of a recipient user in the social network group to cause a playlist associated with the video playing software to be automatically populated with the video, the video playing software being configured to automatically populate the video shared by the sharing user in the playlist of the recipient user if the request satisfies at least one sharing configuration defined by the recipient user,
wherein the at least one sharing configuration defined by the recipient user is at least one of:
the sharing user is an approved user;
the user-assigned rank of the video meets a second predetermined threshold rank; and
a maximum number of recommended videos has not been exceeded.

14. The method as recited in claim 1, wherein the video playing software is configured to automatically populate the video shared by the sharing user in the playlist of the recipient user at a default playlist position for automatically-populated videos, which was previously defined by the recipient user, the default playlist position for automatically-populated videos being last in the playlist.

15. The method as recited in claim 1, wherein the video playing software is configured to automatically populate the video shared by the sharing user in the playlist of the recipient user at a default playlist position for automatically-populated videos, which was previously defined by the recipient user, the default playlist position for automatically-populated videos being first in the playlist.

16. The method as recited in claim 1, wherein the video playing software is configured to automatically populate the video shared by the sharing user in the playlist of the recipient user at a default playlist position for automatically-populated videos, which was previously defined by the recipient user, the default playlist position for automatically-populated videos being interspersed evenly with other, non-automatically-populated videos in the playlist.

17. The method as recited in claim 2, wherein the video playing software is configured to automatically populate the video shared by the sharing user in the playlist of the recipient user at a default playlist position for automatically-populated videos, which was previously defined by the recipient user, the default playlist position for automatically-populated videos being last in the playlist.

18. The method as recited in claim 2, wherein the video playing software is configured to automatically populate the video shared by the sharing user in the playlist of the recipient user at a default playlist position for automatically-populated videos, which was previously defined by the recipient user, the default playlist position for automatically-populated videos being first in the playlist.

19. The method as recited in claim 2, wherein the video playing software is configured to automatically populate the video shared by the sharing user in the playlist of the recipient user at a default playlist position for automatically-populated videos, which was previously defined by the recipient user, the default playlist position for automatically-populated videos being interspersed evenly with other, non-automatically-populated videos in the playlist.

20. The method as recited in claim 13, wherein the video playing software is configured to automatically populate the video shared by the sharing user in the playlist of the recipient user at a default playlist position for automatically-populated videos, which was previously defined by the recipient user, the default playlist position for automatically-populated videos being last in the playlist.

21. The method as recited in claim 13, wherein the video playing software is configured to automatically populate the video shared by the sharing user in the playlist of the recipient user at a default playlist position for automatically-populated videos, which was previously defined by the recipient user, the default playlist position for automatically-populated videos being first in the playlist.

22. The method as recited in claim 13, wherein the playing software is configured to automatically populate the video shared by the sharing user in the playlist of the recipient user at a default playlist position for automatically-populated videos, which was previously defined by the recipient user, the default playlist position for automatically-populated videos being interspersed evenly with other, non-automatically-populated videos in the playlist.

* * * * *